2,958,614
RESIN COATINGS FOR GLASS MATERIALS

William M. Perry, Bethlehem, Pa., assignor to General Aniline & Film Corporation, New York, N.Y., a corporation of Delaware No Drawing. Filed June 16, 1955, Ser. No. 516,033

6 Claims. (Cl. 117—126)

The present invention relates to resin coatings for glass materials, and particularly to N-vinyl pyrrolidone-vinyl halide copolymers as coating resins for glass materials.

The use of glass fibers as a reinforcement for various thermosetting resins, such as, for example, silicone, melamine, epoxide, furan resins, and the like, has been undergoing development for the past several years. The size, such as starch-oil medium normally applied to glass strands which are converted into yarn and finally into cloth, must be removed so as to prepare the surface thereof for bonding to a laminating resin. In order to avoid expensive processing steps in desizing such strands by caramelization, heat-treatment or aqueous desizing, etc., several finishes have been proposed which are designed to improve the bond between the glass and the thermosetting resin. Finishes of this type consist of methacrylatochromic chloride and vinyl trichlorosilane. In the former type the inorganic portion of the molecule attaches itself to the glass surface, leaving the unsaturated methacrylato group to take part in the cross-linking reaction with the laminating thermosetting resin. In the latter type, the trichlorosilane portion, after hydrolysis, attaches itself to the glass surface leaving the unsaturated vinyl group to take part in the cross-linking reaction. Both of these finishes, particularly the methacrylatochromic chloride, while permitting more intimate contact between the linking resin and glass, are expensive.

To offset the high cost of the foregoing finishes, it has been proposed to incorporate into thermosetting resin compositions employed for laminating purposes polymerizable monomers, such as, for example, styrene, methyl methacrylate, diallyl phthalate, vinyl chloride, vinyl acetate, ethyl vinyl ether, methyl vinyl ketone, and the like. The principal disadvantage of such polymerizable monomers when mixed with thermosetting resins, particularly polyester resins, is that the resulting cured resin has poor adhesion to glass. It has also been proposed to employ as a size for glass fibers, glass mats and the like, copolymers obtained by copolymerizing 40–90% of a N-vinyl pyrrolidone with 10–60% of a vinyl ester, such as vinyl acetate and the like. Such copolymers cannot be effectively used for lamination. Copolymers of N-vinyl pyrrolidone and vinyl laurate are equally inapplicable because of their water solubility, particularly those containing from 80–100 parts by weight of N-vinyl pyrrolidone and 1–20 parts by weight of vinyl laurate.

Polyvinyl chloride has little if any adhesion to glass. Methods to modify it by copolymerizing vinyl chloride with other polymerizable monomers has proved ineffectual. If glass cloths or glass fibers are impregnated with polyvinyl chloride and copolymers of N-vinyl esters containing from 5–30 carbon atoms with N-vinyl pyrrolidone, followed by curing, yield laminates having exceedingly poor flexural strength.

It is an object of the present invention to overcome the foregoing difficulties and to provide a new copolymeric material having the unexpected property of possessing excellent adhesion to various types of glass materials.

Other objects and advantages will become more clearly apparent from the following specification.

I have found that copolymers obtained by copolymerizing 10–95% by weight of a N-vinyl pyrrolidone with 90–5% by weight of a vinyl halide when applied to any glass surface, yield a coating having an extremely high adhesion thereto. The glass material may be of any type, such as glass fibers, glass strands, glass mats, glass cloth and other structural material fabricated from glass fibers or glass cloth. The copolymers may be employed not only as finishes or sizes for glass strands, but also directly applied to glass in the manufacture of safety glass, i.e., as a laminating agent between two sheets of glass. They may be also employed as protective coatings for glass aerosol bottles which will protect the bottle not only from being scratched, but also strengthens the bottle from explosion. Various glass cloths, fabrics, fibers, glass mats and the like may be impregnated with the copolymers and then subjected to lamination with the conventional thermosetting resins. Despite the fact that the copolymers may contain as much as 95% of a N-vinyl pyrrolidone when used as a glass coating followed by application of a thermosetting resin for building up cured laminated structures, the copolymers, even after prolonged water immersion, display tenacious adhesion to glass, and with no apparent leaching when immersed in water for prolonged periods of time.

In preparing the copolymers of the present invention 10–95% by weight of a N-vinyl pyrrolidone are dissolved in either 2-butanone, benzene, acetone, or any other conventional solvent normally employed in the polymerization of vinyl monomers or copolymerization of vinyl halides with other vinyl monomers. To the solution 0.05 to 5.00 percent by weight of $\alpha,\alpha'$-azodiisobutyronitrile are added and the resulting solution placed into an autoclave. The autoclave is sealed, purged twice with nitrogen and pressure tested at 215 lbs./sq. inch for 30 minutes, after which time the autoclave is vented and 90–5% by weight of a vinyl halide, such as vinyl chloride, vinyl bromide or vinyl fluoride, added through a Kidde cylinder. The autoclave is heated to 60° C. and stirred with an enamel-coated stirrer for approximately 20 hours. The pressure at this time will drop from 24 lbs./sq. inch to approximately 15 lbs./sq. inch during the reaction time. The autoclave is then cooled to room temperature, and vented to a Dry Ice trap. The trap will not gain in weight. The contents of the autoclave are then poured into a tared Pyrex dish, or other suitable vessel, and placed in an air stream to evaporate the solvent employed during the polymerization. After about 8 hours a thick syrup will ensue, which is placed in a desiccator under vacuum (0.3 mm. of Hg) and the residual solvent removed. The copolymer in all cases is a straw-colored friable material which is easily pulverized in a ball mill or with a mortar and pestle.

The solid copolymer, after pulverization, may be readily dissolved in an amount ranging from 5 to 15% by weight of acetone, 1-methyl-2-pyrrolidone, butyrolactone, methanol, N,N-dimethylformamide, 2-butanone, and the like or mixtures thereof. The solution may be employed directly as a protective coating for solid glass or employed in the conventional manner for application to glass fiber, glass cloth, glass mats, or other structural material fabricated from glass.

The N-vinyl pyrrolidones which are copolymerized with a vinyl halide are characterized by the following general formula:

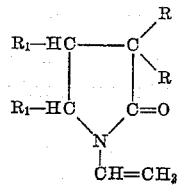

wherein R and $R_1$ represent either hydrogen, methyl or ethyl groups.

As specific illustrations of the above N-vinyl pyrrolidones, the following may be mentioned:

N-vinyl-2-pyrrolidone
5-methyl-N-vinyl-2-pyrrolidone
5-ethyl-N-vinyl-2-pyrrolidone
3,3-dimethyl-N-vinyl-2-pyrrolidone
3-methyl-N-vinyl-2-pyrrolidone
4-methyl-N-vinyl-2-pyrrolidone
4-ethyl-N-vinyl-2-pyrrolidone The following will illustrate the manner in which the present invention may be practiced.

166.5 grams of N-vinyl-2-pyrrolidone, 1.64 grams of $\alpha,\alpha'$-azodiisobutyronitrile and 175 grams of 2-butanone were placed in a steel autoclave. The autoclave was sealed, purged twice with nitrogen gas and pressure tested at 215 lbs./sq. inch for approximately 30 minutes, after which time it was vented and 30 grams of vinyl chloride added by means of a Kidde cylinder. The autoclave was heated to 60° C. and stirred with an enamel coated stirrer for approximately 20 hours. During this time the pressure dropped from 24 lbs./sq. inch to 15 lbs./sq. inch during the copolymerization reaction. Thereafter the autoclave was cooled to room temperature and vented into a Dry Ice trap. The contents of the autoclave were poured into a tared Pyrex dish and placed in an air stream to evaporate the 2-butanone. After approximately 18 hours a thick syrup remained which was placed in a desiccator under vacuum of 0.3 mm. of mercury, and the remaining 2-butanone removed. The polymer was a straw-colored, friable material easily pulverized with a mortar and pestle.

Analysis for volatiles gave 6.14% so that the actual yield of the dry copolymer were 195.7 grams or 93.7% of the theoretical yield. Analysis for nitrogen gave 10.52% which when corrected for volatiles counted for 88.90% of N-vinyl-2-pyrrolidone bound in the copolymer. This by difference yields a copolymer having 11.1% of bound vinyl chloride. A 10% solution of the copolymer in 2-butanone when applied to a glass mat, yielded after evaporation of the solvent, a clear film which adhered to the glass.

The following twelve copolymers were prepared in a similar manner in accordance with the foregoing procedure:

| Copolymer Sample | Percent By Weight of N-Vinyl-2-pyrrolidone | Percent By Weight of Vinyl Halide |
|---|---|---|
| 1 | 73% N-vinyl-2-pyrrolidone | 27% Vinyl chloride. |
| 2 | 10% N-vinyl-2-pyrrolidone | 90% Vinyl chloride. |
| 3 | 58% 3-methyl-N-vinyl-2-pyrrolidone | 42% Vinyl bromide. |
| 4 | 88% 4-ethyl-N-vinyl-2-pyrrolidone | 12% Vinyl fluoride. |
| 5 | 91% 3,3-dimethyl-N-vinyl-2-pyrrolidone | 9% Vinyl chloride. |
| 6 | 87% 5-methyl-N-vinyl-2-pyrrolidone | 13% Vinyl chloride. |
| 7 | 87% N-vinyl-2-pyrrolidone | 13% Vinyl chloride. |
| 8 | 93% N-vinyl-2-pyrrolidone | 7% Vinyl chloride. |
| 9 | 77% N-vinyl-2-pyrrolidone | 23% Vinyl chloride. |
| 10 | 92% N-vinyl-2-pyrrolidone | 8% Vinyl chloride. |
| 11 | 90% N-vinyl-2-pyrrolidone | 10% Vinyl chloride. |
| 12 | 95% N-vinyl-2-pyrrolidone | 5% Vinyl chloride. |

A 10% solution of each of the above twelve copolymers was prepared by dissolving one gram of the copolymer in 9 grams of 2-butanone. The solution was then applied to a glass sheet with the aid of a doctor blade set at 0.008″. After the evaporation of the solvent the dry copolymeric film was very clear and adhered tenaciously to glass. All attempts to remove or peel the film proved unsuccessful.

It is to be noted that the foregoing solvents for dissolving the copolymers are merely suggestive. Other solvents may be employed, or mixtures thereof, such as, tetrahydrofurfuryl alcohol, methanol, 2-propanol, methyl ethlyl ketone, and the like. In those cases where the copolymer contains from 25–95% by weight of a N-vinyl-2-pyrrolidone, water-soluble solvents such as, acetone, methanol, ethanol, 2-propanol and the like, may be partially replaced by water. In some cases a mixture of 50% acetone and 50% water effects solution of such copolymer, thus bringing about considerable economy in application of the copolymeric solution.

In addition to the use of the foregoing copolymers as sizing for glass fibers, glass cloth, glass mats, and the like, they may be employed as pre-coatings for all such glass materials prior to coating with unsaturated polyester resins and other thermosetting resins in the preparation of laminates. In such case, the copolymers being tenaciously bonded to the glass material, promote the attachment or adhesion of the thermosetting resin to the precoated glass surface, thereby ensuring excellent flexural strength in the final product.

I claim:

1. The process of sizing a glass surface which comprises applying to said surface a uniform coating of a composition consisting of a 5 to 15% solution of a copolymer of 90–5% by weight of a vinyl halide and 10–95% by weight of N-vinyl-pyrrolidone having the following general formula:

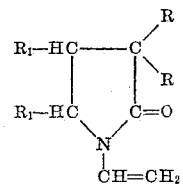

wherein R and $R_1$ represent a member selected from the group consisting of hydrogen, methyl and ethyl groups, the said copolymer being in solution of at least one solvent selected from the class consisting of acetone, butyrolactone, 2-butanone, N,N-dimethylformamide, ethanol, methanol, propanol, 1-methyl-2-pyrrolidone and tetrahydrofurfuryl alcohol.

2. The process according to claim 1 wherein the N-vinyl pyrrolidone in the copolymer is N-vinyl-2-pyrrolidone.

3. The process according to claim 1 wherein the N-vinyl pyrrolidone in the copolymer is 3-methyl-N-vinyl-2-pyrrolidone.

4. The process according to claim 1 wherein the N-vinyl pyrrolidone in the copolymer is 3,3-dimethyl-N-vinyl-2-pyrrolidone.

5. The process according to claim 1 wherein the N-vinyl pyrrolidone in the copolymer is 4-methyl-N-vinyl-2-pyrrolidone.

6. The process according to claim 1 wherein the N-vinyl pyrrolidone in the copolymer is 5-methyl-N-vinyl-2-pyrrolidone.

References Cited in the file of this patent

UNITED STATES PATENTS

| | | |
|---|---|---|
| 2,335,454 | Schuster et al. | Nov. 30, 1943 |
| 2,471,959 | Hunt | May 31, 1949 |
| 2,628,922 | Carlin | Feb. 17, 1953 |
| 2,665,271 | Beller | Jan. 5, 1954 |
| 2,667,473 | Morner | Jan. 26, 1954 |
| 2,676,949 | Morner | Apr. 27, 1954 |
| 2,695,895 | Barnard | Nov. 30, 1954 |
| 2,728,739 | Jones | Dec. 27, 1955 |

OTHER REFERENCES

Zeitschrift fur Elektrochemie, May 1955, vol. 59, #4, pages 309–311.